No. 668,902. Patented Feb. 26, 1901.
A. BEYER.
HEATING AND COOKING STOVE.
(Application filed Nov. 30, 1900.)
(No Model.)
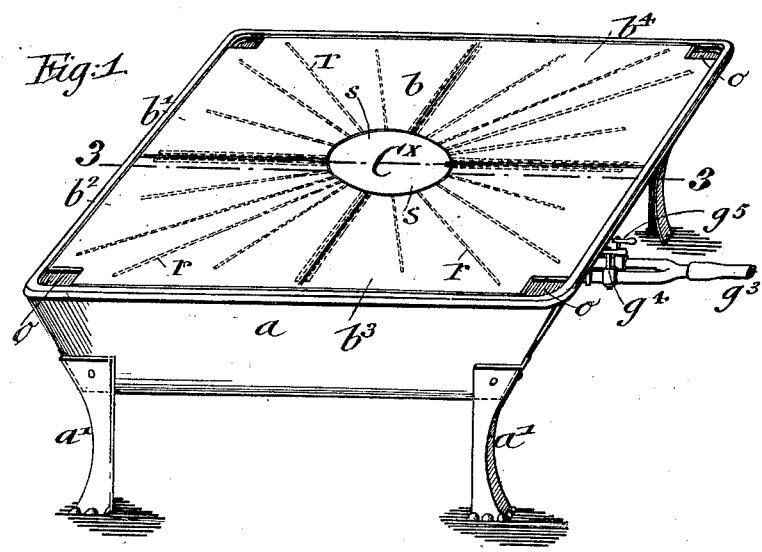
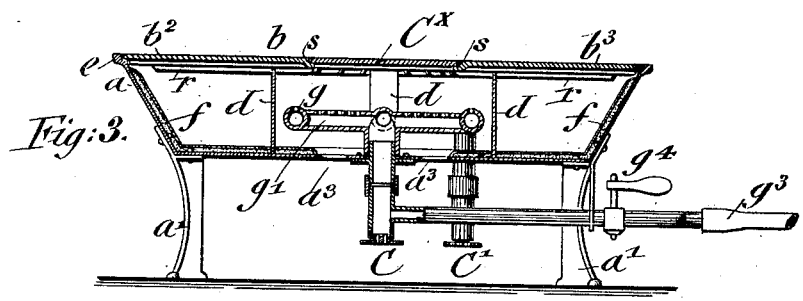
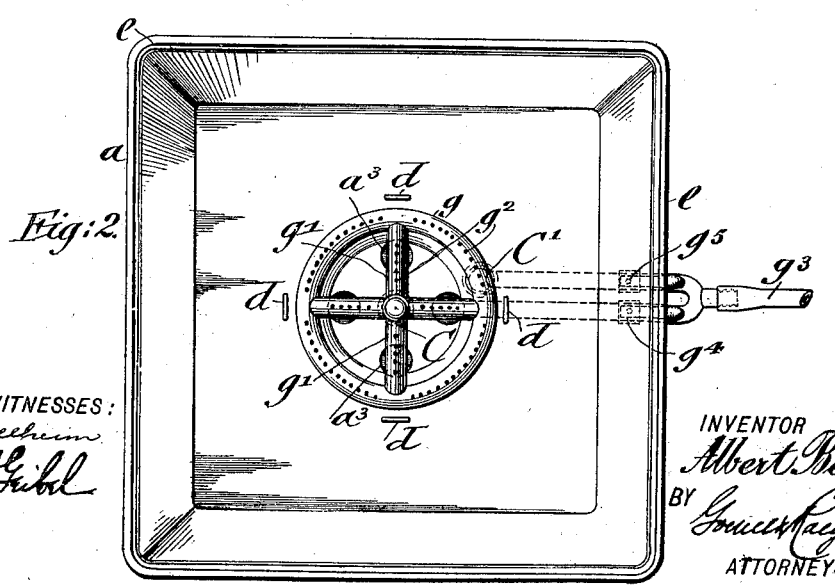
WITNESSES:
INVENTOR
Albert Beyer
BY
ATTORNEYS

UNITED STATES PATENT OFFICE.

ALBERT BEYER, OF HOBOKEN, NEW JERSEY.

HEATING AND COOKING STOVE.

SPECIFICATION forming part of Letters Patent No. 668,902, dated February 26, 1901.

Application filed November 30, 1900. Serial No. 38,153. (No model.)

*To all whom it may concern:*

Be it known that I, ALBERT BEYER, a citizen of the United States, residing in Hoboken, in the county of Hudson and State of New Jersey, have invented certain new and useful Improvements in Heating and Cooking Stoves, of which the following is a specification.

This invention relates to an improved heating and cooking stove in which a Bunsen burner or any coal-oil or alcohol burner is employed and in which the heat from the flame is distributed in radial direction toward the corners of the stove, so as to enlarge the heating-surface of the stove without requiring additional burners; and the invention consists of a stove either portable or forming the top of a gas-range open at the top, a detachable cover formed of four rectangular sections and having a central opening, said sections being provided with radiating ribs on the under side and said cover being supported around the central opening by upright stays rising from the bottom of the casing and resting at its rim on the upper edge of the casing. The sections of the cover are provided with draft-openings at their outer corners, so that the products of combustion are drawn in diagonal direction from the burner for heating the outer portions of the cover, as will be fully described hereinafter and finally pointed out in the claims.

In the accompanying drawings, Figure 1 represents a perspective view of my improved gas-stove. Fig. 2 is a plan view of the same with the cover removed, and Fig. 3 is a vertical transverse section on line 3 3, Fig. 1.

Similar letters of reference indicate corresponding parts.

Referring to the drawings, $a$ represents a casing which is made, preferably, of square or other shape and supported on legs $a'$, that are riveted in the usual manner to the casing $a$, or if used in a gas-stove it forms the complete top of the same. The inner surface of the casing is preferably lined with asbestos or any other suitable non-conductor of heat having a sheet-metal covering or facing $f$, so as to prevent radiation of heat from the casing. The upper part of the casing is provided with a rabbeted edge $e$, which forms a seat for the cover $b$, which is formed of four rectangular portions $b'\ b^2\ b^3\ b^4$, provided at their inner corners with quadrantal recesses and rabbeted seats $s$ along the edges of the same and at their outer corners with rectangular or other recesses $o$, which serve as draft-openings. The bottom of the casing is provided with upright stays $d$, which serve as supports for the cover-sections $b'\ b^2\ b^3\ b^4$. The cover-sections are provided at their under sides with radiating ribs $r$, the abutting edge ribs resting on the upright stays $d$, as shown in Fig. 3. A central round lid $C^\times$ is seated on the rabbeted edges $s$ of the cover-sections.

Through the center of the bottom of the casing $a$ passes the tubular shanks $C\ C'$ of a circular Bunsen burner, which is composed of a ring $g$ and radial arms $g'$, separated one from the other, said circular burner being provided with small openings $g^2$ at its upper parts for the formation of the gas-jets. Below the burner the body of the casing is provided with openings $a^3$ for permitting the air to pass to the jets of the circular burner. The air passes in through the openings of the shanks $C\ C'$ of the Bunsen burner, while the gas is supplied by the pipe $g^3$, having branch pipes connected with the shanks $C\ C'$ and respectively provided with stop-cocks $g^4\ g^5$. By making the burner in two parts $g\ g'$ they may be used separately or together by proper control of the gas-cocks. The gas may also be introduced through the sides if the gas-stove forms top of a gas-range. In place of a Bunsen burner supplied with ordinary gas an alcohol, gasolene, or petroleum burner may be used for heating the stove, the same being applicable for heating or cooking purposes.

When the stove is to be used, the center lid is removed by a stove-lifter in the usual manner, after which the stop cock or cocks is or are opened and the burner lighted. The vessel which is to be heated is then placed over the central opening for being subjected to the direct heat of the flame, while other vessels can be placed around the same on the cover-sections $b'\ b^2\ b^3\ b^4$. The products of combustion are drawn in diagonal direction toward the corner-openings $o$ in the cover-sections, so as to heat up all the parts of the stove in an even and effective manner. The air required for combustion is drawn in through the bottom openings and conducted to the burner. The products of combustion impinge on the under sides of the sections and are conducted along the same toward the corner-openings, so that the vessels placed on the cover-sections are uniformly heated, so that the entire top of the stove can be used for cooking purposes. As all the heat obtained from one large circular burner is utilized in an economical and effective manner a cheap and effective gas-stove is obtained.

Having thus described my invention, I claim as new and desire to secure by Letters Patent—

1. The combination, with a supporting-casing having a suitable burner, of upright stays extending from the bottom of the casing, rectangular cover-sections supported on said stays and on the edge of the casing, said cover-sections being provided with corner draft-openings, and a removable lid supported on the inner edge of the cover-sections, substantially as set forth.

2. The combination, with a casing provided with a rabbeted edge, of upright stays extending from the bottom of the casing, a circular burner in the center of the casing, a cover formed of four corner-sections provided with corner draft-openings at their outer ends, and radiating ribs at their under side, a central lid, supported on the inner edges of the rabbeted sections, and air-supply openings for the burner, substantially as set forth.

In testimony that I claim the foregoing as my invention I have signed my name in presence of two subscribing witnesses.

ALBERT BEYER.

Witnesses:
PAUL GOEPEL,
GEORGE GEIBEL.